July 21, 1936.  G. R. HAUB  2,047,962
IMPULSE TYPE GLASS FEEDER
Filed May 13, 1933
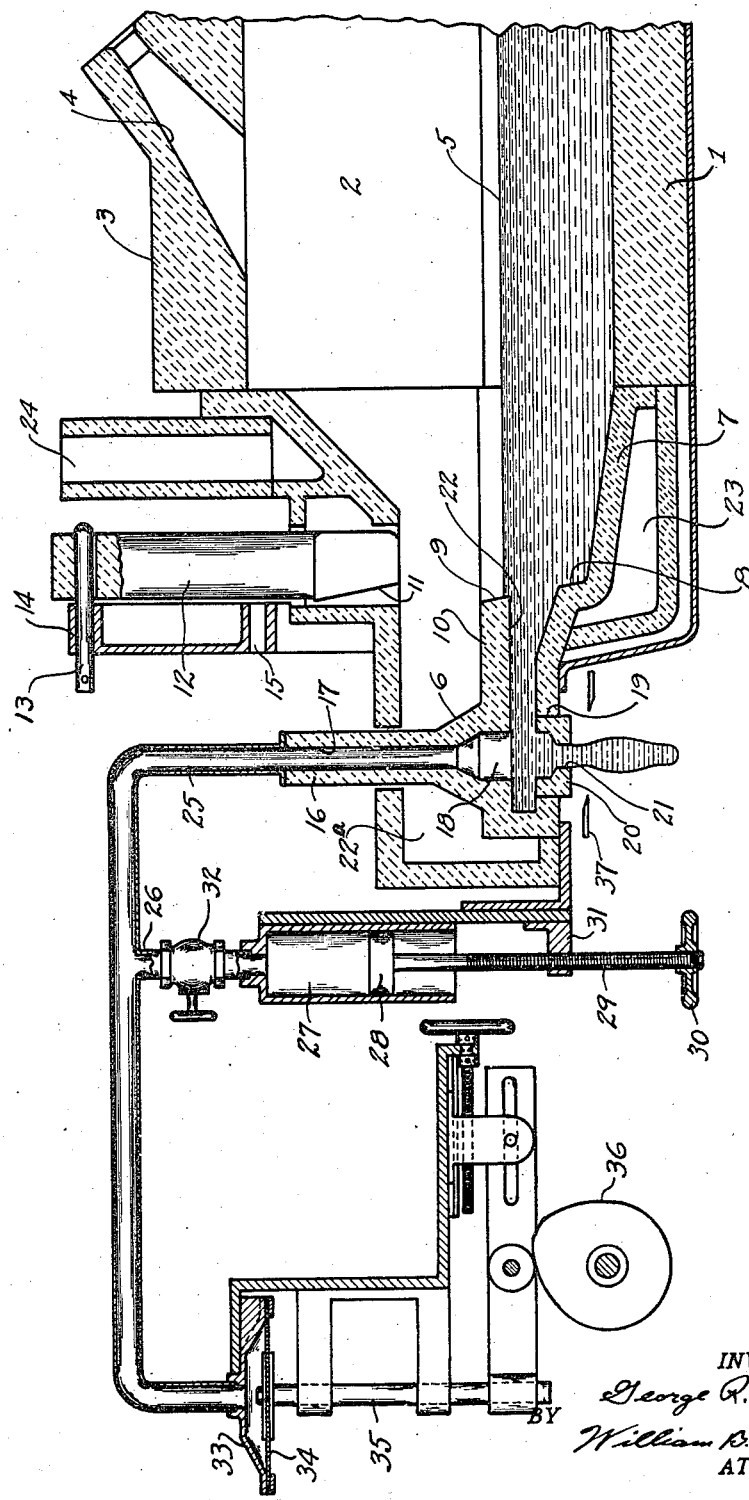
INVENTOR
George R. Haub
BY William B. Jaspert
ATTORNEY Patented July 21, 1936

2,047,962

UNITED STATES PATENT OFFICE 2,047,962

IMPULSE TYPE GLASS FEEDER

George R. Haub, Glenshaw, Pa., assignor to Shawkee Manufacturing Company, Pittsburgh, Pa., a corporation of Pennsylvania Application May 13, 1933, Serial No. 670,829

4 Claims. (Cl. 49—55)

This invention relates to new and useful improvements in apparatus for segregating mold charges of glass from a mass of molten glass more particularly to the impulse type of glass feeder mechanism utilizing positive and negative air pressure for acting upon a pool of glass to extrude gobs or mold charges.

It is among the objects of this invention to provide means for controlling the weight and shape of the glass gob before it is segregated from the mass of molten glass.

A further object of the invention is the provision of means for obtaining a relatively wide range of gob sizes by simple adjustment means which when set to adjusted positions shall maintain the size of the mold charge indefinitely during subsequent operation.

Still another object of the invention is the provision of means for regulating the weight and shape of the gob by varying the pressure on the glass above the feeding orifice in a novel manner, and which pressure regulation shall be effective without varying the operation of the pressure or impulse producing mechanism.

These and other objects of the invention will become more apparent from a consideration of the accompanying drawing constituting a part hereof in which like reference characters designate like parts and in which the single figure is a vertical cross-sectional view taken longitudinally of a feeder mechanism and forehearth structure and embodying the principles of this invention.

In the drawing, the reference numeral 1 designates the forehearth having side walls 2 and a top wall 3, the latter being provided with a burner port 4 for directing a flame stream downwardly to the glass in the forward portion of the hearth.

The rear of the hearth communicates with a source of molten glass such as a glass melting tank which supplies glass to the forehearth at a rate to maintain a constant level of the glass as designated by the reference numeral 5.

A feeder boot generally designated by the reference numeral 6 constitutes an extension of the forehearth 1 and is preferably, although not necessarily, an integrally formed refractory block having an inclined bottom portion 7, the end of which is contiguous with the surface of the hearth 1 forming a shoulder at 8 in alinement with the end 9 of the top wall 10 of the boot, the surfaces 8 and 9 being inclined complementary to the inclined surface 11 of a valve or stopper 12 which is mounted to assume two positions, namely, the position shown which is the elevated position in which it is held by a pin 13 extending through an opening in a casting 14, and a lowered position which brings the face 11 of the valve in seating engagement with the faces 8 and 9 of the boot in which latter position it is also held by the pin 13 projected through the opening 15 provided in the casting.

The front portion of the boot has a sleeve-like projection 16 having a central orifice 17 terminating into an enlarged impulse chamber designated by the reference numeral 18. Directly beneath the chamber 18 is an opening 19 for receiving a refractory ring 20 having a feeding orifice 21 therein. A passage 22 extends from the impulse chamber 18 to the glass pool in the forehearth structure, and this passage 22 constitutes a feed passage for conducting molten glass from the forehearth to the impulse chamber and above the feeding orifice 21. To assure an adequate volume of glass being supplied to the impulse chamber 18, the passage 22 is of maximum area, this being provided by making the passage flat and wide so as to minimize the distance from the passage 22 to the feeding orifice 21.

The block 6 is provided with a flue passage around the impulse chamber 18 and adjacent the orifice ring 20 to conduct the products of combustion from the burner port 4 downwardly around the block 6 to the chamber at the front of the block designated by the numeral 22 from which it passes downwardly around the block in the region of the impulse chamber and orifice ring 20ª, thence into the chamber designated by the numeral 23 from which it is conducted upwardly through a stack 24, thus bringing the hot gases in contact with the refactory parts in the region where the proper thermal condition of the glass must be maintained.

Connected to the refractory sleeve 16 is a conduit 25 having a T-connection leading to an expansion chamber 27 which is in the form of a cylinder closed at one end by a piston 28 which is mounted on a screw shaft 29 having a hand wheel 30, by means of which the piston 28 in the cylinder 27 may be adjusted, the screw shaft 29 being journalled in a bracket 31 secured to the front end of the feeder boot, or it may be mounted in any other suitable manner. A valve 32 is disposed between the T-connection 26 and the expansion chamber 27 to cut out the chamber 27 from the conduit 25.

The conduit 25 is extended to an impulse member which consists of a conical shaped housing 33 having a flexible diaphragm 34 mounted therein, the diaphragm being actuated by a rod 35 operatively connected to a drive mechanism generally designated by the reference numeral 36. A piston and cylinder or any other pressure alternating device may be employed in place of the diaphragm. A pair of shear blades or other suitable shearing mechanism designated by the numeral 37 are provided beneath the feeding orifice to sever the extruded gobs, and as the shearing operation must take place in timed relation with the extrusion process, the shear operating mechanism (not shown) is connected to the impulse drive mechanism to be operative in synchronous relation with the impulses transmitted to the glass above the feeding orifice 21. The operation of the described mechanism is briefly as follows:—

With the plug or valve 12 in its raised position as shown in the drawing, the glass flows through the feed passage 22 to the impulse chamber 18 above the feeding orifice 21, and preliminary to the opening of the valve 12 the impulse drive mechanism 36 is energized to actuate the pressure diaphragm 34 which upon the up stroke of the rod 35 subjects the air in the conduit 25 to pressure which is communicated to the expansion chamber 27 if the valve 32 is open and to the impulse chamber 18 of the feeder boot. Upon the return stroke of plunger 35, the diaphragm 34 produces a suction or vacuum in the conduit 25, chamber 27, and impulse chamber 18 to produce a negative pressure above the glass in the feeding orifice 21.

While it has been the general understanding of those familiar with impulse gob feeder mechanisms that the weight of the gob extruded increases with the length of the pressure or impulse stroke applied to the surface of the glass above the feeding orifice, I have found that this understanding is entirely incorrect and that the maximum amount of glass is extruded by the application of a minimum pressure stroke to the surface of the glass above the feeding orifice. The correctness of this theory will become apparent from the following explanation.

Obviously, an impulse feeder extrudes a gob by the action of gravity acting upon the molten glass above the feeding orifice combined with the impulses produced in the impulse chamber 18.

The size of the gob through its transverse dimension is primarily controlled by the diameter of the feeding orifice, and if no impulse were applied to the chamber 18, the glass would feed by gravity through the orifice 21 in a continuous stream of a thickness less than the diameter of the feeding orifice. The application of pressure to the glass above the orifice supplements the gravity flow by forcing glass out at a faster rate, and accordingly, the stream of glass may be made of the same diameter as the feeding orifice or larger, depending upon the degree of pressure applied to the glass. By the application of a negative pressure in the impulse chamber 18, the glass stream is caused to contract beneath and inside the feeding orifice at which time the extruded glass is severed by the shear mechanism 37. By regulating the time of application of the pressure impulse and the subsequent application of negative pressure, the length, weight and shape of the gob is controlled.

I have found that by lengthening the stroke of the diaphragm 34 thereby increasing the intensity and duration of pressure, a gob of less weight will be formed than if the stroke of the diaphragm be shortened, this being accountable for by the fact that on the return movement of the long stroke, the vacuum is maintained in the impulse chamber 18 for a longer period of time, thus giving the glass in the passage 22 less time to flow to the space above the feeding orifice, so that upon the subsequent application of the pressure stroke there is less glass available for feeding through the orifice 21. Consequently, by utilizing a shorter stroke, the normal flow of glass through the feed passage 22, if of sufficient area, to the impulse chamber 18, is least interfered with so that the pressure impulse available on the short stroke of the diaphragm will be more effective in extruding a larger mass of glass for each impulse of the mechanism than where the long stroke impulse is utilized.

As it would require complex mechanism to regulate the stroke of the diaphragm 34 or its actuating rod 35 to vary or regulate the shape and weight of the gobs, I vary the volume of air acted upon by employing the expansion chamber 27 and the simple screw adjusting mechanism for moving the piston 28 to vary the size of the expansion chamber.

By opening or closing valve 32, the chamber 27 can be cut-out entirely or connected into the impulse conduit at will to give a wider range of operation to the impulse mechanism for different sized gobs, and by means of the screw shaft 29, very fine adjustments may be made for gob shapes and weights which can be maintained indefinitely so long as the thermal properties of the glass above the feeding orifice are maintained constant, the latter being essential to successful operation.

I have found by experience that in making sixteen-ounce bottles, at the rate of seventeen per minute, utilizing a two and one-eighth inch feeding orifice, there will be a weight variation of one ounce between the long gob and short gob, or in other words the long gob is produced by the short impulse stroke while the minimum weight or short gob is produced by the long impulse stroke.

By means of the herein described mechanism, a wide range of gob sizes may be produced by merely changing the orifice ring 20 and making adjustment of the piston element 28 by means of the hand wheel 30 to vary the intensity of the impulses applied to the glass in the impulse chamber 18.

I also attribute successful operation, over a wide range of gob sizes without varying the stroke of the diaphragm, to the employment of a minimum head of glass above the feeding orifice, the horizontal feed passage 22 being flush with the feed ring 20 as shown in the drawing.

While I have herein shown and described one embodiment of the invention, it will be obvious to those skilled in the art that various modifications may be made in the details of construction without departing from the principles herein set forth.

I claim:

1. Apparatus for segregating mold charges from a mass of molten glass comprising a refractory block having a feeding chamber, a feeding orifice beneath said chamber, a feed passage leading from a source of molten glass to said chamber, an impulse mechanism, a passage connecting said mechanism and feeding chamber, an expansion chamber connected in said passage, and means for varying the volume of said last named chamber.

2. Apparatus for segregating mold charges from a mass of molten glass comprising a refractory block having a feeding chamber, a feeding orifice beneath said chamber, a feed passage leading from a source of molten glass to said chamber, an impulse mechanism, a passage connecting said mechanism and feeding chamber, an expansion chamber connected in said passage, a piston in said chamber, and adjustable means for moving the piston in said chamber.

3. Apparatus for segregating mold charges from a mass of molten glass comprising a forehearth communicating with a source of glass supply, a feeding spout at one end thereof having a submerged feeding orifice of substantially the diameter of the desired mold charge, a reciprocating impulse mechanism and a conduit above the feed orifice leading to said impulse mechanism and being of substantially the diameter of the feed orifice, and means for varying the total volume of the passage between the impulse mechanism and the surface of the glass independently of the length of stroke of said impulse mechanism.

4. Apparatus for segregating mold charges from a mass of molten glass comprising a forehearth communicating with a source of glass supply, a feeding spout at one end thereof having a submerged feeding orifice, a reciprocating impulse mechanism and a conduit above the said orifice leading to said impulse mechanism, and means for varying the impulse pressure effective on the glass in the feeding orifice independently of the pressure impulses produced by the said impulse mechanism.

GEORGE R. HAUB.